(12) United States Patent
Worley, III et al.

(10) Patent No.: US 9,134,593 B1
(45) Date of Patent: Sep. 15, 2015

(54) GENERATION AND MODULATION OF NON-VISIBLE STRUCTURED LIGHT FOR AUGMENTED REALITY PROJECTION SYSTEM

(75) Inventors: William Spencer Worley, III, Half Moon Bay, CA (US); William Thomas Weatherford, San Mateo, CA (US); Christopher Coley, Morgan Hill, CA (US); Edward Dietz Crump, Santa Cruz, CA (US)

(73) Assignee: Amazon Technologies, Inc., Reno, NV (US)

( * ) Notice: Subject to any disclaimer, the term of this patent is extended or adjusted under 35 U.S.C. 154(b) by 24 days.

(21) Appl. No.: 12/977,760

(22) Filed: Dec. 23, 2010

(51) Int. Cl.
G03B 21/14 (2006.01)
(52) U.S. Cl.
CPC .............. *G03B 21/147* (2013.01); *G03B 21/14* (2013.01)
(58) Field of Classification Search
CPC ....... G03B 21/14; G03B 21/147; G03B 11/25
USPC ..................................................... 353/31, 84
See application file for complete search history.

(56) References Cited

U.S. PATENT DOCUMENTS

| | | | |
|---|---|---|---|
| 3,835,245 A | 9/1974 | Pieters | |
| 3,840,699 A | 10/1974 | Bowerman | |
| 4,112,463 A | 9/1978 | Kamin | |
| 5,704,836 A | 1/1998 | Norton et al. | |
| 5,946,209 A | 8/1999 | Eckel et al. | |
| 6,059,576 A | 5/2000 | Brann | |
| 6,098,091 A | 8/2000 | Kisor | |
| 6,503,195 B1 | 1/2003 | Keller et al. | |
| 6,618,076 B1 | 9/2003 | Sukthankar et al. | |
| 6,690,618 B2 | 2/2004 | Tomasi et al. | |
| 6,760,045 B1 | 7/2004 | Quinn et al. | |
| 6,789,903 B2 | 9/2004 | Parker et al. | |
| 6,803,928 B2 | 10/2004 | Bimber et al. | |
| 6,811,267 B1 * | 11/2004 | Allen et al. ................... 353/122 |
| 7,046,214 B2 | 5/2006 | Ebersole, Jr. et al. | |
| 7,315,241 B1 | 1/2008 | Daily et al. | |
| 7,418,392 B1 | 8/2008 | Mozer et al. | |
| 7,538,764 B2 | 5/2009 | Salomie | |
| 7,720,683 B1 | 5/2010 | Vermeulen et al. | |
| 7,743,348 B2 | 6/2010 | Robbins et al. | |

(Continued)

FOREIGN PATENT DOCUMENTS

FR  WO2009/112585  9/2009
WO  WO2011088053 A2  7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.
Office action for U.S. Appl. No. 12/982,519, mailed on Feb. 7, 2013, Worley III, "Complementing Operation of Display Devices in an Augmented Reality Environment", 13 pages.
Final Office Action for U.S. Appl. No. 12/982,457, mailed on May 8, 2014, William Spencer Worley III, "Utilizing Content Output Devices in an Augmented Reality Environment", 58 pages.

(Continued)

*Primary Examiner* — Sultan Chowdhury
*Assistant Examiner* — Danell L Owens
(74) *Attorney, Agent, or Firm* — Lee & Hayes, PLLC (57) ABSTRACT

A display system having a modulated light source is configured to include one or more non-visible wavelengths as part of the display sequence. In one implementation a color wheel, configured to modulate the wavelengths emitted by a projector, includes an infrared (IR) segment, allowing for projection of an IR image. The wavelength modulated non-visible light may be spatially modulated to generate a structured light pattern, for signaling, to synchronization with other devices, and so forth.

26 Claims, 7 Drawing Sheets

(56) References Cited

U.S. PATENT DOCUMENTS

| | | | |
|---|---|---|---|
| 7,774,204 | B2 | 8/2010 | Mozer et al. |
| 7,911,444 | B2 | 3/2011 | Yee |
| 7,925,996 | B2 | 4/2011 | Hofmeister et al. |
| 7,949,148 | B2 | 5/2011 | Rhoads et al. |
| 8,107,736 | B2 | 1/2012 | Brown et al. |
| 8,159,739 | B2 | 4/2012 | Woodgate et al. |
| 8,199,966 | B2 | 6/2012 | Guven et al. |
| 8,253,746 | B2 | 8/2012 | Geisner et al. |
| 8,264,536 | B2 | 9/2012 | McEldowney |
| 8,284,205 | B2 | 10/2012 | Miller et al. |
| 8,285,256 | B2 | 10/2012 | Gupta et al. |
| 8,307,388 | B2 | 11/2012 | Igoe et al. |
| 8,308,304 | B2 | 11/2012 | Jung et al. |
| 8,382,295 | B1 | 2/2013 | Kim et al. |
| 8,408,720 | B2 | 4/2013 | Nishigaki et al. |
| 8,591,039 | B2 | 11/2013 | Morrison et al. |
| 2001/0049713 | A1 | 12/2001 | Arnold et al. |
| 2002/0001044 | A1 | 1/2002 | Villamide |
| 2002/0070278 | A1 | 6/2002 | Hung et al. |
| 2004/0046736 | A1 | 3/2004 | Pryor et al. |
| 2004/0190716 | A1 | 9/2004 | Nelson |
| 2004/0201823 | A1 | 10/2004 | Raskar et al. |
| 2005/0081164 | A1 | 4/2005 | Hama et al. |
| 2005/0110964 | A1 | 5/2005 | Bell et al. |
| 2005/0128196 | A1 | 6/2005 | Popescu et al. |
| 2005/0254683 | A1* | 11/2005 | Schumann et al. ........... 382/100 |
| 2005/0264555 | A1 | 12/2005 | Zhou et al. |
| 2005/0276444 | A1 | 12/2005 | Zhou et al. |
| 2005/0288078 | A1 | 12/2005 | Cheok et al. |
| 2005/0289590 | A1 | 12/2005 | Cheok et al. |
| 2006/0028400 | A1 | 2/2006 | Lapstun et al. |
| 2006/0041926 | A1 | 2/2006 | Istvan et al. |
| 2006/0080408 | A1 | 4/2006 | Istvan et al. |
| 2006/0152803 | A1 | 7/2006 | Provitola |
| 2006/0170880 | A1* | 8/2006 | Dambach et al. .............. 353/84 |
| 2006/0262140 | A1 | 11/2006 | Kujawa et al. |
| 2007/0005747 | A1 | 1/2007 | Batni et al. |
| 2007/0024644 | A1 | 2/2007 | Bailey |
| 2007/0239211 | A1 | 10/2007 | Lorincz et al. |
| 2007/0260669 | A1 | 11/2007 | Neiman et al. |
| 2008/0094588 | A1 | 4/2008 | Cole et al. |
| 2008/0151195 | A1 | 6/2008 | Pacheco et al. |
| 2008/0174735 | A1 | 7/2008 | Quach et al. |
| 2008/0180640 | A1* | 7/2008 | Ito ................................. 353/31 |
| 2008/0186255 | A1 | 8/2008 | Cohen et al. |
| 2008/0229318 | A1 | 9/2008 | Franke |
| 2008/0273754 | A1 | 11/2008 | Hick et al. |
| 2009/0066805 | A1 | 3/2009 | Fujiwara et al. |
| 2009/0073034 | A1 | 3/2009 | Lin |
| 2009/0184888 | A1 | 7/2009 | Chen et al. |
| 2010/0011637 | A1 | 1/2010 | Zhang |
| 2010/0026479 | A1 | 2/2010 | Tran |
| 2010/0060723 | A1 | 3/2010 | Kimura et al. |
| 2010/0066676 | A1 | 3/2010 | Kramer et al. |
| 2010/0164990 | A1 | 7/2010 | Van Doorn |
| 2010/0199232 | A1 | 8/2010 | Mistry et al. |
| 2010/0207872 | A1 | 8/2010 | Chen et al. |
| 2010/0240455 | A1 | 9/2010 | Gagner et al. |
| 2010/0257252 | A1 | 10/2010 | Dougherty et al. |
| 2010/0284055 | A1 | 11/2010 | Kothari et al. |
| 2011/0012925 | A1 | 1/2011 | Luo |
| 2011/0050885 | A1* | 3/2011 | McEldowney ................ 348/135 |
| 2011/0061100 | A1 | 3/2011 | Mattila et al. |
| 2011/0072047 | A1 | 3/2011 | Wang et al. |
| 2011/0087731 | A1 | 4/2011 | Wong et al. |
| 2011/0093094 | A1 | 4/2011 | Goyal et al. |
| 2011/0096844 | A1 | 4/2011 | Poupel et al. |
| 2011/0134204 | A1 | 6/2011 | Rodriguez et al. |
| 2011/0154350 | A1 | 6/2011 | Doyle et al. |
| 2011/0161912 | A1 | 6/2011 | Eteminan et al. |
| 2011/0164163 | A1 | 7/2011 | Bilbrey et al. |
| 2011/0197147 | A1 | 8/2011 | Fai |
| 2011/0216090 | A1 | 9/2011 | Woo et al. |
| 2011/0238751 | A1 | 9/2011 | Belimpasakis et al. |
| 2011/0249197 | A1 | 10/2011 | Sprowl et al. |
| 2012/0009874 | A1 | 1/2012 | Kiukkonen et al. |
| 2012/0120296 | A1 | 5/2012 | Roberts et al. |
| 2012/0124245 | A1 | 5/2012 | Reeves et al. |
| 2012/0127320 | A1 | 5/2012 | Balogh |
| 2012/0130513 | A1 | 5/2012 | Hao et al. |
| 2012/0223885 | A1 | 9/2012 | Perez |
| 2012/0306878 | A1 | 12/2012 | Wang et al. |
| 2013/0235354 | A1 | 9/2013 | Kilcher et al. |
| 2013/0300637 | A1 | 11/2013 | Smits et al. |

OTHER PUBLICATIONS

Office action for U.S. Appl. No. 12/978,800, mailed on Jun. 17, 2014, Worley III, "Integrated Augmented Reality Environment", 40 pages.

Office Action for U.S. Appl. No. 12/977,949, mailed on Jan. 22, 2014, William Spencer Worley III, "Powered Augmented Reality Projection Accessory Display Device", 11 pages.

Office action for U.S. Appl. No. 12/977,924, mailed on Nov. 15, 2013, Coley, et al., "Characterization of a Scene With Structured Light", 9 pages.

Office Action for U.S. Appl. No. 13/236,294, mailed on Nov. 7, 2013, Christopher Coley, "Optical Interference Mitigation", 12 pages.

Office Action for U.S. Appl. No. 12/982,457, mailed on Dec. 3, 2013, William Spencer Worley III, "Utilizing Content Output Devices in an Augmented Reality Environment", 56 pages.

Office Action for U.S. Appl. No. 12/978,800, mailed on Oct. 25, 2013, William Spencer Worley III, "Integrated Augmented Reality Environment", 36 pages.

Office action for U.S. Appl. No. 12/982,519, mailed on Aug. 29, 2013, Worley III, "Complementing Operation of Display Devices in an Augmented Reality Environment", 12 pages.

Sneath, "The Bumper List of Windows 7 Secrets", retrieved on Aug. 21, 2013, at http://blogs.msdn.com/b/tims/archive/2009/01/12/ the bumper-list-of-windows-7-secrets.aspx., 2009, 13 pages.

Office Action for U.S. Appl. No. 12/982,519, mailed on Feb. 12, 2014, William Spencer Worley III, "Complementing Operation of Display Devices in an Augmented Reality Environment", 12 pages.

Final Office Action for U.S. Appl. No. 13/236,294, mailed on Mar. 13, 2014, Christopher Coley, "Optical Interference Mitigation", 14 pages.

Office Action for U.S. Appl. No. 12/975,175, mailed on Apr. 10, 2014, William Spencer Worley III, "Designation of Zones of Interest Within an Augmented Reality Environment", 33 pages.

Office Action for U.S. Appl. No. 12/977,992, mailed on Apr. 4, 2014, William Spencer Worley III, "Unpowered Augmented Reality Projection Accessory Display Device", 6 pages.

Office Action for U.S. Appl. No. 12/982,519, mailed on Mar. 5, 2015, William Spencer Worley III, "Complementing Operation of Display Devices in an Augmented Reality Environment", 13 pages.

Final Office Action for U.S. Appl. No. 12/982,457, mailed on Apr. 8, 2015, William Spencer Worley III, "Utilizing Content Output Devices in an Augmented Reality Environment", 64 pages.

Foscam User Manual, Model:F19821W, retrieved at <<http://foscam.us/downloads/F19821W%20user%20manual.pdf>>, May 2010, pp. 45-46 (71 pages).

Office Action for U.S. Appl. No. 12/975,175, mailed on Oct. 1, 2014, William Spencer Worley III, "Designation of Zones of Interest Within an Augmented Reality Environment", 36 pages.

Office action for U.S. Appl. No. 12/982,457, mailed on Oct. 8, 2014, Worley III et al., "Utilizing Content Output Devices in an Augmented Reality Environment", 62 pages.

Office action for U.S. Appl. No. 12/982,519, mailed on Aug. 14, 2014, Worley III, "Complementing Operation of Display Devices in an Augmented Reality Environment", 12 pages.

Office Action for U.S. Appl. No. 13/236,294, mailed on Oct. 22, 2014, Christopher Coley, "Optical Interference Mitigation", 20 pages.

Office Action for U.S. Appl. No. 12/978,800, mailed on Dec. 2, 2014, William Spencer Worley III, "Integrated Augmented Reality Environment", 46 pages.

* cited by examiner

| TIME 402 | IMAGE FRAME 404 | SUB-FRAME 406 | WAVELENGTH MODULATOR STATE 408 |
|---|---|---|---|
| 0 | 1 | 1 | RED |
| 1 | 1 | 2 | GREEN |
| 2 | 1 | 3 | BLUE |
| 3 | 1 | 4 | NON-VISIBLE |
| 4 | 2 | 1 | RED |
| 5 | 2 | 2 | GREEN |
| 6 | 2 | 3 | BLUE |
| 8 | 2 | 4 | NON-VISIBLE |
| 8 | 3 | 1 | RED |
| 9 | 3 | 2 | GREEN |

GENERATION AND MODULATION OF NON-VISIBLE STRUCTURED LIGHT FOR AUGMENTED REALITY PROJECTION SYSTEM

BACKGROUND

Wavelength and spatially modulated non-visible light is useful in a variety of applications. However, traditional techniques to generate non-visible images in conjunction with visible light images have resulted in devices which are complicated or expensive to implement.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Non-visible light images are useful in several applications. Non-visible light may be used to transmit information to devices, form structured light patterns, broadcast synchronization pulses, and so forth. In the instance of structured light, a known image or pattern is projected onto an otherwise unknown physical scene. By observing the distortion in the known pattern, the topology of the scene may be characterized. Structured light which is non-visible to a user's eye, such as infrared (IR) or ultraviolet (UV) light, allows for characterization of the scene in a manner that is imperceptible to the user.

Described herein are devices and techniques for projecting both visible and non-visible images with a single device. Projected images, including structured light patterns, may use one or more different wavelengths (or colors) of light. A light source for the projected image may, in some implementations, comprise a multiple-wavelength light source, such as an incandescent lamp. Un-modulated light from the multiple-wavelength light source may by modulated by a wavelength modulator to produce a particular wavelength or pre-determined range of wavelengths of light.

In one implementation, the wavelength modulator may be a color wheel placed in an optical path of an image projector. The color wheel comprises a plurality of segments, with each segment configured to pass a pre-determined range of wavelengths. A color wheel motor spins the color wheel, producing a sequence of light in the pre-determined range of wavelengths associated with each segment. One or more segments of the color wheel are configured to pass or transmit the pre-determined range of visible wavelengths and substantially block other wavelengths outside of the pre-determined range. One or more other segments of the color wheel are configured to pass the pre-determined range of non-visible infrared wavelengths while substantially blocking other wavelengths outside of the pre-determined range non-visible range. Images are formed by timing spatial modulation of the light.

In other implementations, the wavelength modulator may comprise other devices such as acousto-optic modulators, prisms, diffraction gratings, and so forth. The wavelength modulator is constructed such that incoming light is processed and outgoing light is of a pre-determined range of wavelengths.

In some implementations, the light source itself may be configurable to provide wavelength modulated light. As a result, rather than filtering output from a lamp which emits over a wide range of wavelengths, a wavelength modulated light source may be configured to produce a particular wavelength or pre-determined range of wavelengths.

The wavelength modulated light source may comprise solid state light sources such as lasers, light emitting diodes (LEDs), and so forth. These solid state light sources may be switched on and off to allow for production of a particular pre-determined range of wavelengths, or a particular wavelength where the light source is monochromatic, at a particular time. In other implementations, non-solid state light sources such as gas lasers, dye lasers, and so forth may also be used as wavelength modulated light sources.

The wavelength modulated light source includes emitters for visible and non-visible light. By having both visible and non-visible light available, specific images may be rendered in particular wavelengths by an imaging modulator.

The imaging modulator spatially modulates the wavelength modulated light to produce an image. The wavelength modulator or wavelength modulated light source may be synchronized with the imaging modulator such that when a particular pre-determined range of wavelengths is being produced, a particular image may be generated therefrom.

Compared to the rates of change of the wavelength modulator and imaging modulator, the eye has a relatively long integration time. This effect is also known as "persistence of vision" and enables the non-visible image to be interspersed amongst visible light images. For example, a given frame of a color image may include four sub-frames: a red sub-frame with an associated image corresponding to the red channel of the frame, a green sub-frame with an associated image corresponding to the green channel of the frame, a blue sub-frame with an associated image corresponding to the blue channel of the frame, and a non-visible light sub-frame with an associated image such as a structured light pattern. The sequencing of the sub-frames and the interval during which each sub-frame is projected are configured to minimize or eliminate user-perceptible flicker. In some implementations, the duration of the non-visible sub-frame may differ from the duration of the visible sub-frames. For example, the non-visible sub-frame may have a shorter or longer duration than the sub-frames corresponding to visible light.

A wavelength modulation synchronization signal may also be generated which indicates the state of the wavelength modulated light source. A camera configured to sense the non-visible light may use this signal to synchronize image capture and recover structured light data. A computing device may then accept the structured light data and process the data. Processing may include determining the physical arrangement of objects within a room, or the shape of the room itself, based at least in part upon the structured light data.

Illustrative Projection Systems

Figure 1:
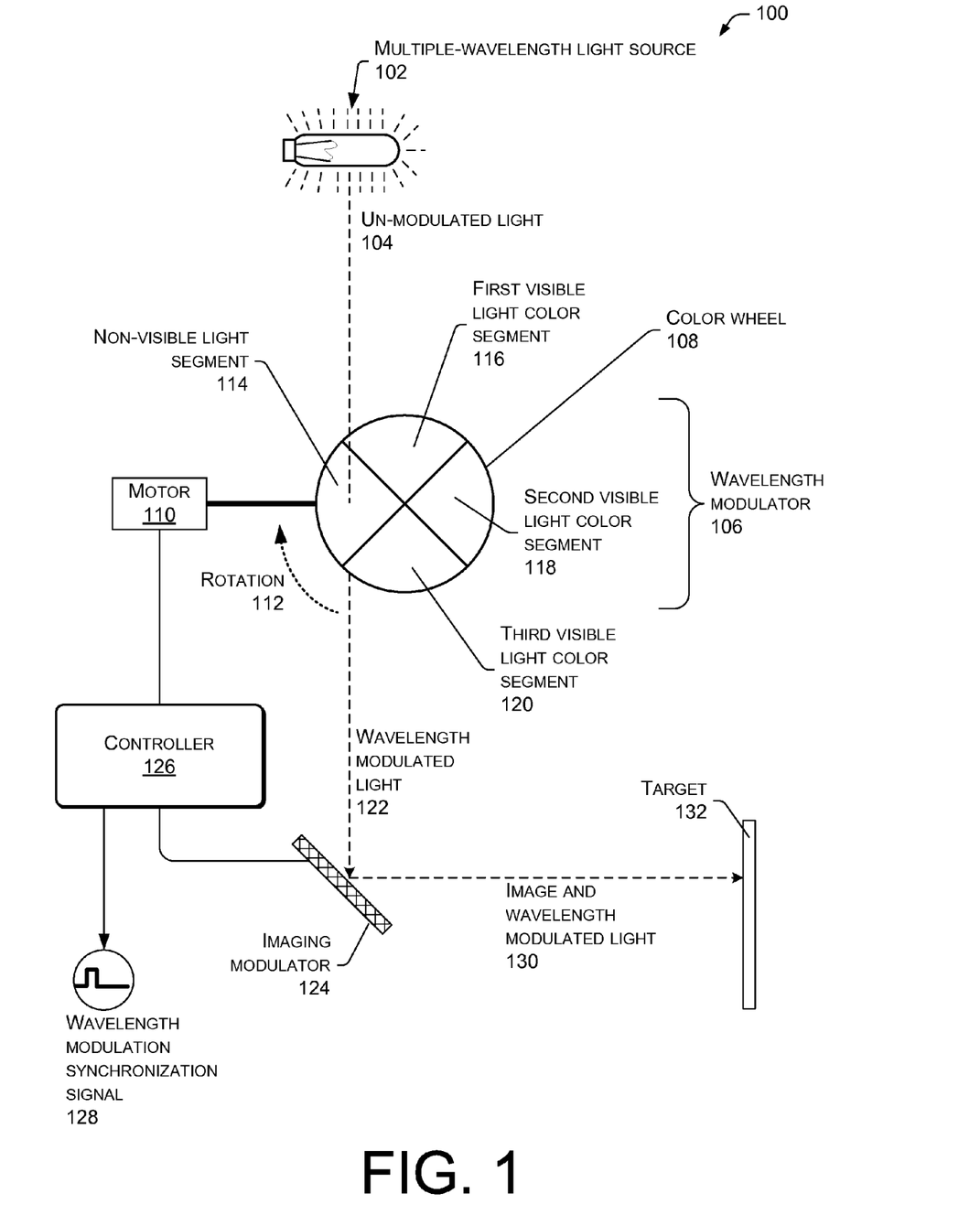
FIG. 1 shows an illustrative image projector having a color wheel with an infrared filter segment and configured to selectively produce a non-visible and a visible image.

FIG. 1 shows an illustrative projector 100 configured to generate an image from non-visible as well as visible light. In this and the following illustrations, lenses, mirrors, and other components are omitted for clarity, and not by way of limitation. The projector 100 has a multiple-wavelength light source 102. For example, the multiple-wavelength light source 102 may comprise an incandescent lamp. The multiple-wavelength light source 102 emits un-modulated light 104, that is light which is polychromatic. For example, the incandescent lamp may emit visible light as well as infrared light.

At least a portion of the un-modulated light 104 is configured to impinge upon a wavelength modulator 106. The wavelength modulator 106 is configured to selectively pass a pre-determined range of wavelengths for a given interval of time. In the implementation shown in this figure, the wavelength modulator 106 comprises a color wheel 108 coupled to a motor 110. The color wheel 108 comprises a plurality of segments. Each segment of the color wheel is configured to pass a pre-determined range of wavelengths. These wavelengths may be visible or non-visible. The motor 110 rotates the color wheel, as indicated with arrow 112, such that for a given moment of time while a segment is in an optical path, the particular pre-determined range of wavelengths of that segment may pass. As the color wheel 108 rotates, over time the pre-determined range of wavelengths changes according to the sequence of the segments on the color wheel.

The color wheel 108 is illustrated with four segments, one for non-visible light and three for visible light. Four segments are shown by way of illustration, and not as a limitation. More or fewer segments may be used. Furthermore, in some implementations multiple segments may be configured to pass the same pre-determined range of wavelengths.

A non-visible light segment 114 is configured to pass a pre-determined range of non-visible wavelengths. These non-visible wavelengths are outside of the range of wavelengths visible to the user. For example, non-visible wavelengths may be longer or shorter than the range of wavelengths visible to the user. In one implementation, the non-visible wavelengths are in an infrared portion of the spectrum. More specifically, in one implementation the non-visible light segment may be configured to pass wavelengths of about 935-940 nanometers (nm) and significantly attenuate other wavelengths below a pre-determined threshold or block wavelengths outside of this range. For ease of illustration and not by way of limitation one non-visible light segment 114 is shown here. In other implementations additional non-visible light segments 114 may be present on the color wheel 108.

Three visible light color segments are also shown in this illustration: a first visible light color segment 116, a second visible light color segment 118, and a third visible light color segment 120. For example, in some implementations these may correspond to red, green, and blue filters suitable for the reproduction of a color image from a generally white light source.

After being filtered by the wavelength modulator 106, the un-modulated light 104 is now wavelength modulated light 122. The wavelength modulated light 122 may then impinge upon an imaging modulator 124. The imaging modulator 124 is configured to spatially modulate incident light. The imaging modulator 124 may comprise a digital micromirror device (DMD), liquid crystal on silicon (LCOS), liquid crystal display (LCD), light valve, and so forth. For example, the imaging modulator 124 may take a beam of incident wavelength modulated light 122 and form an image comprising an array of pixels. In some implementations multiple imaging modulators 124 may be used.

In another implementation, the color wheel 108 may be configured without a visible light color segment, and comprise two or more non-visible light segments 114. The two or more visible light segments 114 and their corresponding pre-determined range of non-visible wavelengths may then be used to generate images such as structured light patterns in these non-visible wavelengths. For example, one non-visible light segment may be configured to pass near infrared, another to pass far infrared, and a third to pass ultraviolet.

A controller 126 may be coupled to the wavelength modulator 106 and the imaging modulator 124. The controller 126 may be configured to maintain synchronization between the wavelength modulation and the image modulation. For example, the controller 126 may be configured such that when a non-visible image is to be modulated on the imaging modulator 124, the non-visible light segment 114 of the color wheel 108 is in the optical path between the multiple-wavelength light source 102 and the imaging modulator 124.

The controller 126 may also be configured to generate or accept a wavelength modulation synchronization signal 128. This synchronization signal 128 may be used to coordinate the operation of other devices, such as a camera.

After image modulation, the now image and wavelength modulated light 130 continues to a target 132. The target 132 may comprise a projection screen, wall, clothing, user, or essentially any other surface configured to accept and present the incident light.

Figure 2:
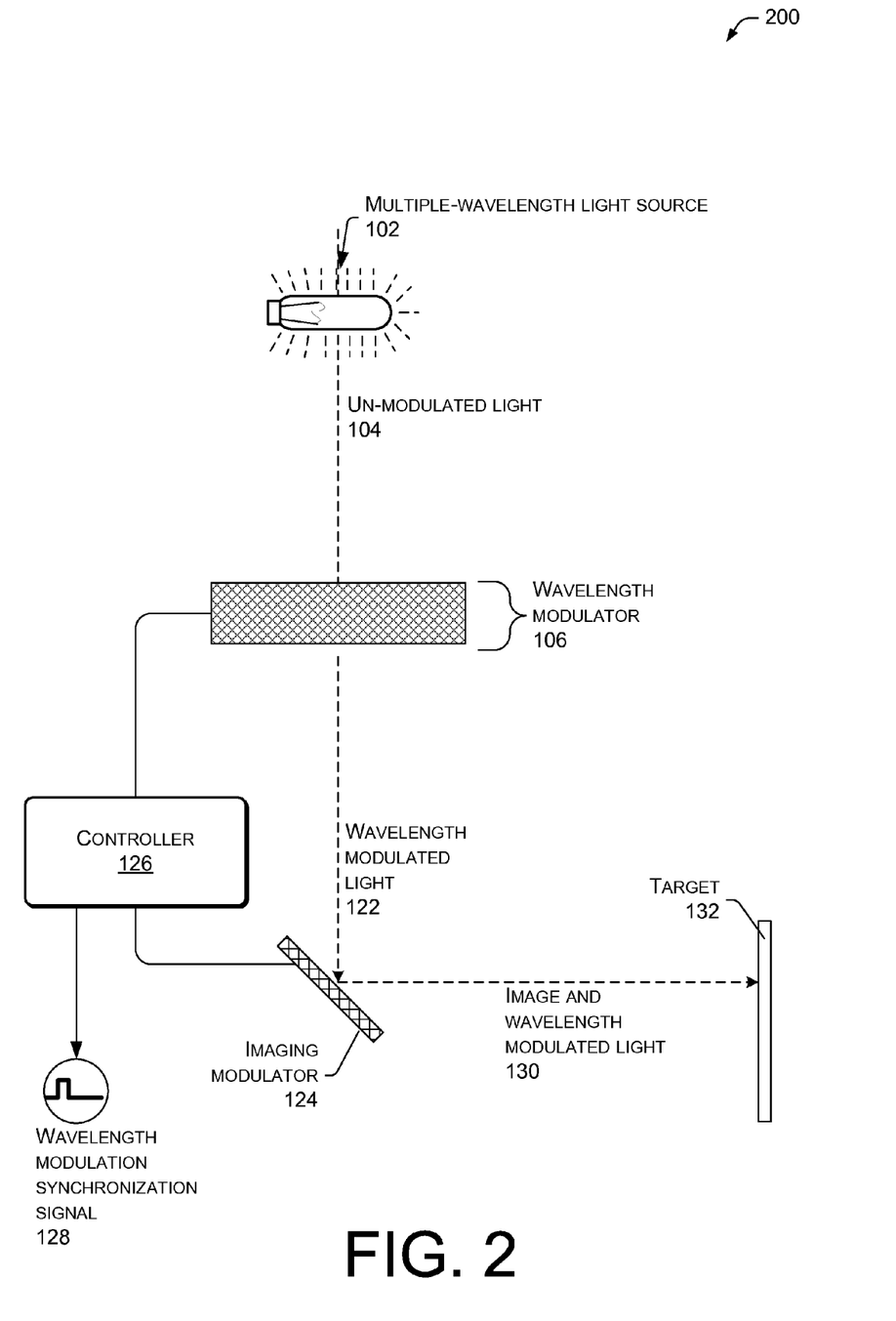
FIG. 2 shows an illustrative image projector having a wavelength modulator configured to selectively produce non-visible and visible images.

FIG. 2 shows an illustrative projector 200 having a wavelength modulator 106 configured to selectively produce a non-visible and a visible image. It is possible to modulate the wavelength of un-modulated light 104 other than with a color wheel. In this illustration, the wavelength modulator 106 may comprise an acousto-optic modulator, liquid crystals, diffraction gratings, prisms, and so forth. As above, the wavelength modulator 106 is configured to pass at a particular time wavelength modulated light 122 of a particular pre-determined range of wavelengths. This wavelength modulated light 122 impinges on the imaging modulator 124 which in turn generates an image on the target 132.

Figure 3:
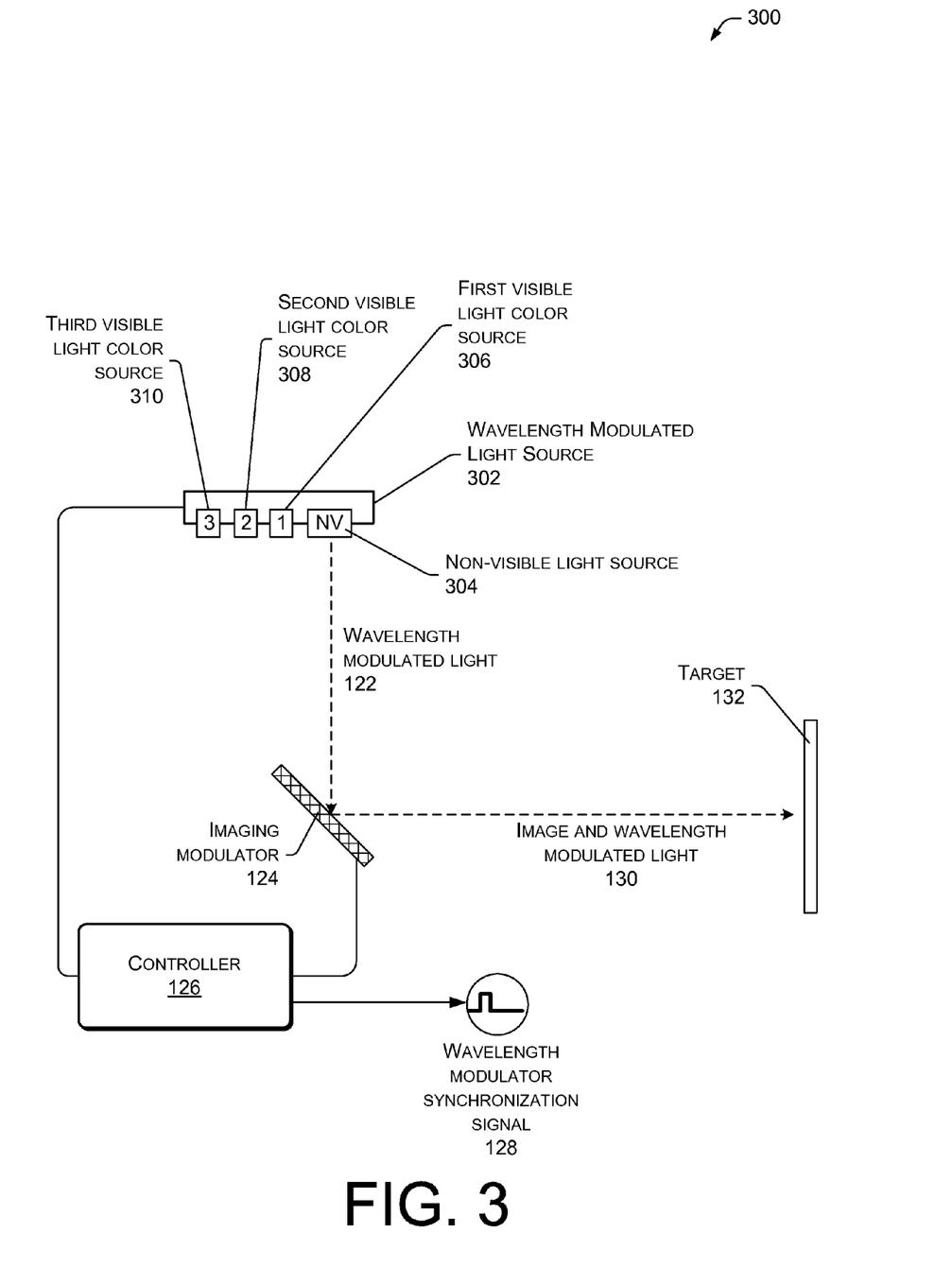
FIG. 3 shows an illustrative image projector having a wavelength modulated light source configured to selectively produce a non-visible and a visible image.

FIG. 3 shows an illustrative projector 300 that is also configured to produce a wavelength modulated light source 122. Rather than employing a multiple-wavelength light source 102 as in FIGS. 1 and 2, however, the light source itself may be configurable to provide the wavelength modulated light 122. Thus, rather than filtering output from a lamp which emits over a wide range of wavelengths, a wavelength modulated light source 302 may be configured to produce a particular wavelength or range of wavelengths. This offers several advantages, including the minimization or elimination of moving parts and dynamic control over the wavelength modulation pattern.

As shown here, the wavelength modulated light source 302 comprises a plurality of emitters or sources of light varying wavelengths. A non-visible light source 302 is shown. Similarly, a first visible light color source 306, second visible light color source 308, and a third visible light color source 310 are also shown as part of the wavelength modulated light source

302. By having both visible and non-visible light available, specific images may be rendered in particular wavelengths by the imaging modulator 124.

The light sources within the wavelength modulated light source 302 may comprise solid state devices such as lasers, light emitting diodes (LEDs), electro- or sono-luminescent materials, and so forth. These solid state light sources may be switched on and off allowing production of a particular pre-determined range of wavelengths, or a particular wavelength where the light source is monochromatic, at a particular time.

The wavelength modulated light source 302 is optically coupled to the imaging modulator 124 such that image and wavelength modulated light 130 may be generated. The controller 126 may coordinate the imaging modulator 124 and the wavelength modulated light source 302 as described above.

Figure 4:
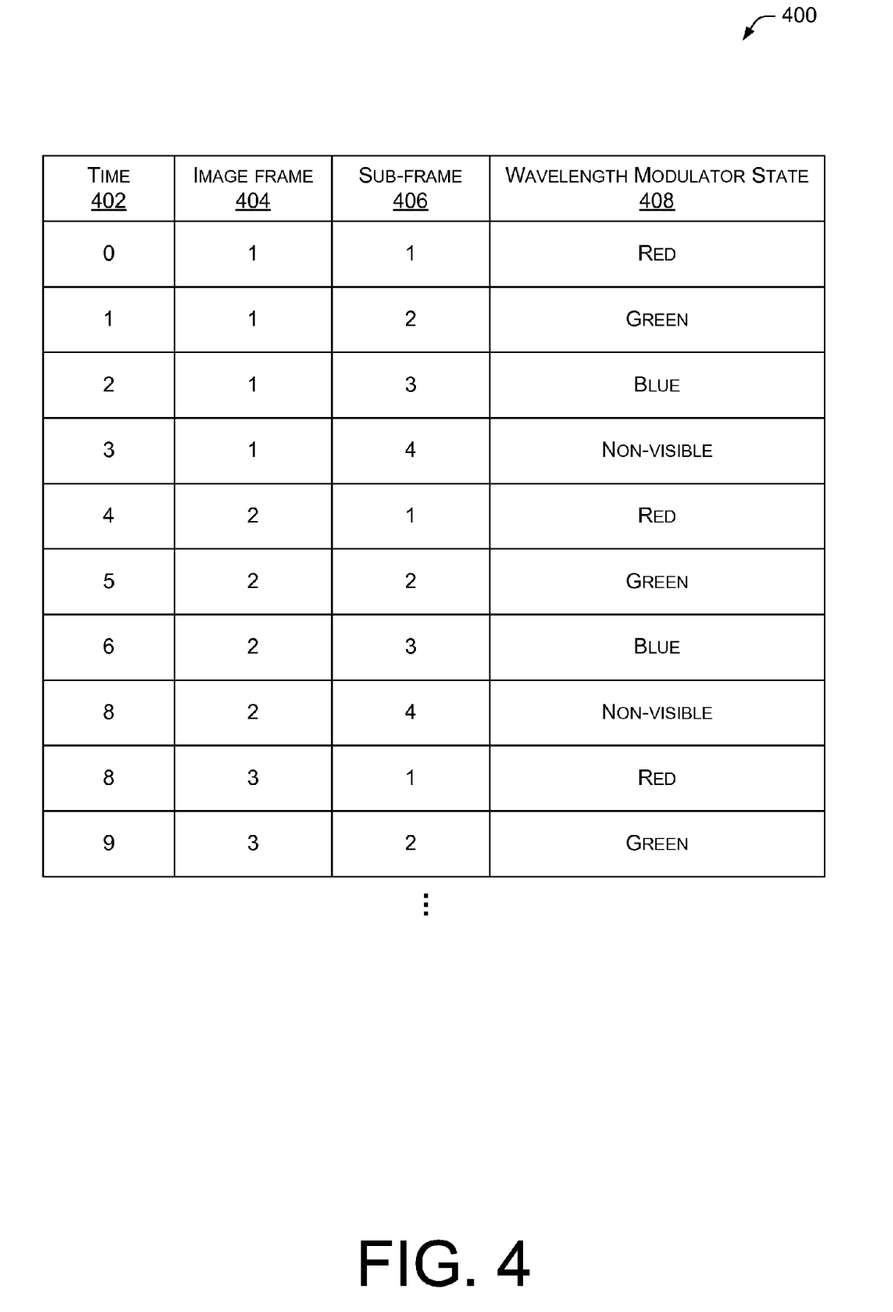
FIG. 4 is an illustrative table showing a time, frame, and sub-frame sequence with associated wavelength modulator states, such as may be used by the image projectors of FIGS. 1-3 to generate both visible and non-visible images.

FIG. 4 is an illustrative table 400 showing a time sequence of wavelength modulator states, such as may be used by the image projectors of FIGS. 1-3 to generate visible light images and non-visible light images. The variation of sub-frames within a particular frame and a pattern of wavelength modulator states within the image projector as time progresses are illustrated. The table includes a first field 402 for a time sequence, a second field 404 for an image frame number, a third field 406 for a sub-frame number, and a fourth field 408 for a wavelength modulator state. The table associates the time sequences in field 402, the image frame number in field 404, and the sub-frame number in field 406 with the corresponding wavelength modulation state in field 408. For example, at the time 402 of zero, the first image frame 404 is in the process of being projected. As part of the projection of that first image frame 404, the first sub-frame 406 is projected with the wavelength modulator state 408 configured to pass red visible light. Thus, during the time 402 of zero, the red portion of the first image frame 404 is being projected. During successive times 402 of one and two, the green and blue sub-frames 406 are presented, respectively. At this point, a color image comprising the three principal color channels has been generated. At the time 402 of three, the fourth sub-frame 406 of the first image frame is being projected. This fourth sub-frame 406 is configured to project a non-visible image. Thus, as shown here, the wavelength modulator state 408 during the fourth sub-frame 406 is set to non-visible. Using this non-visible light, the imaging modulator 124 may form a non-visible image. As described above, this non-visible image is non-visible to users, and may be used to generate structured light, for signaling, and so forth. The non-visible image may be formed with ultraviolet, infrared, or other wavelengths of light outside of the visible range of the user.

In some implementations, the non-visible sub-frame 406 may be configured with a duration different from that of the visible light sub-frames. For example, each of the fourth sub-frames 406 for non-visible light may have a duration of about 4 milliseconds (ms) while the visible light sub-frames 406 may have durations of about 8 milliseconds. Furthermore, the duration of the visible light sub-frames 406 may vary as well.

The timing and distribution of non-visible sub-frames 406 within the wavelength modulation pattern may be configured to reduce or eliminate flicker perceptible to the eye. For example, an overall image frame rate 404 may be 30 hertz while the sub-frames 406 are modulated at 120 hertz, or 1 frame for every 4 sub-frames 406.

When the wavelength modulator 106 allows for selection of a particular range of wavelengths at any time, such as with the wavelength modulated light source 302, the wavelength modulation pattern may be adjusted dynamically. Thus, one or more of the frequency, duration, or sequencing of the non-visible light sub-frames may be changed. For example, when a level of motion or displacement of objects within a physical scene exceeds a pre-determined threshold, additional non-visible light sub-frames may be injected to increase the scanning rate of the scene with structured light.

In another implementation, display settings or environmental conditions may result in a dynamic adjustment to the wavelength modulation pattern. For example, when ambient light increases, the number of non-visible light sub-frames may be reduced to increase the overall brightness of the projected image.

Figure 5:
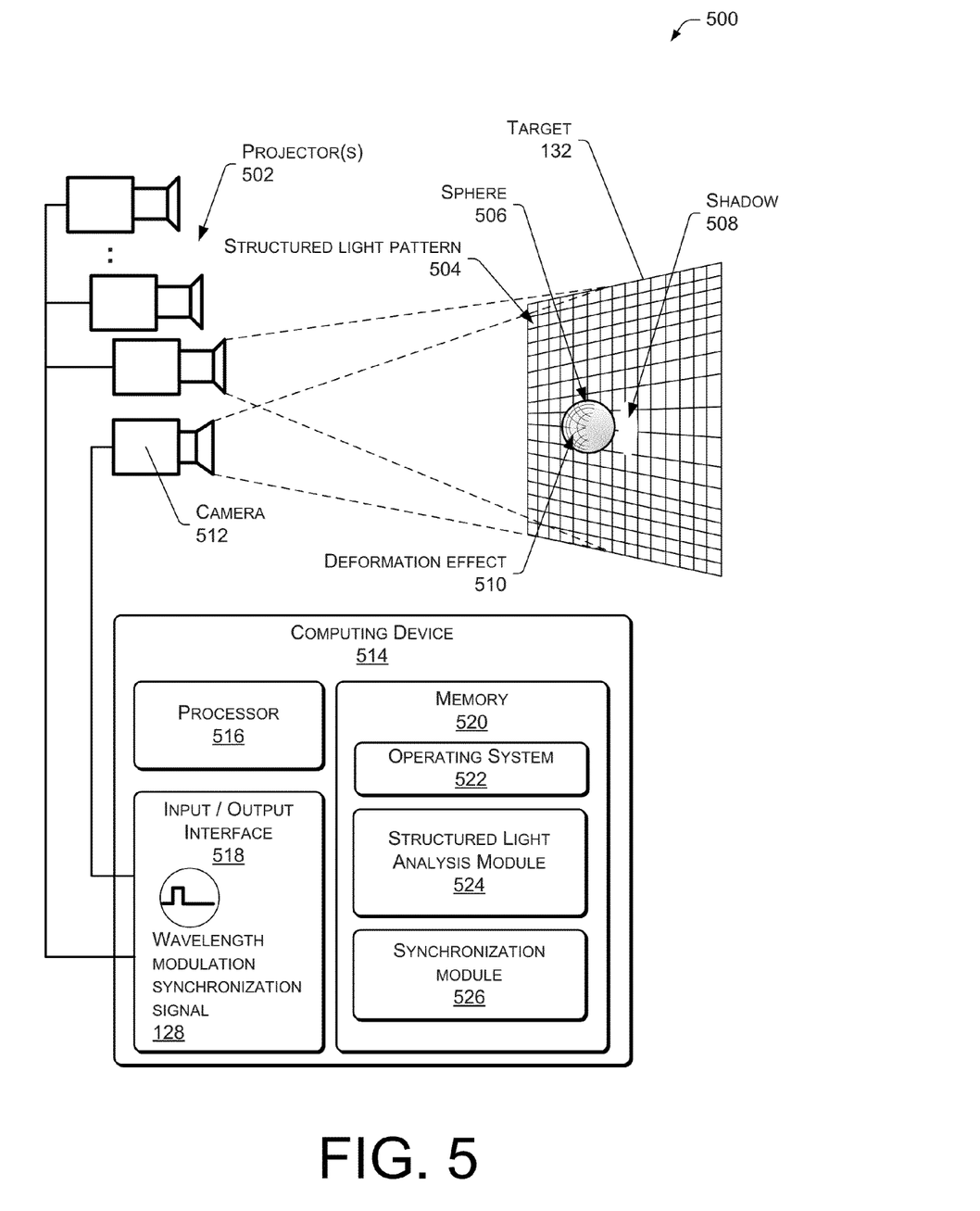
FIG. 5 is an illustrative architecture of an image projector producing a non-visible structured light pattern which is received by a camera and processed by a computing device.

FIG. 5 is an illustrative architecture 500 of a structured light system using the modulated non-visible light projectors. A projector 502 is configured according to one of the implementations described above in FIGS. 1-3 to produce a non-visible structured light pattern 504 during operation. In some implementations multiple projectors 502 may be used. As shown here, the structured light pattern 504 is projected onto the target 132. The structured light pattern 504 shown in this example is a grid. However, in other implementations other structured light patterns may be used, such as a pseudorandom noise pattern. The structured light pattern 504 may also be varied. For example, a first structured light pattern may be used at a first time, a second structured light pattern may be used at a second time, and so forth.

A sphere 506 is shown positioned between the projector 502 and the target 132. A shadow 508 from the sphere 506 is shown on the target 132. Also shown is a deformation effect 510 of the structured light pattern 504 as it interacts with the curved surface of the sphere 506.

This deformation effect 510 is detected by camera 512. The camera 512 is configured to sense or detect the non-visible light. In some implementations the camera 512 may also sense or detect visible light, allowing for multi-spectral imaging of the target. Other effects on the structured light pattern 504 may also be used. For example, a dispersion pattern of points in the structured light pattern 504 may provide details about the scene.

The image captured by the camera 512 is processed by the computing device 514 to determine physical attributes about the scene. The computing device 516 may comprise one or more processors 516, one or more input/output interfaces 518, and a memory 520. The memory may store an operating system 522, structured light analysis module 524, and a synchronization module 526. In some implementations, the resources among a plurality of computing devices 514 may be shared. These resources may include input/output devices such as processors 516, memory 520, and so forth. The memory 520 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

The input/output interface 518 may be configured to couple the computing device 514 to the projector 502 and the camera 512. The coupling between the computing device 514 and the external devices such as the projector and the camera 512 may be via wire, fiber optic cable, wirelessly, and so forth.

The structured light analysis module 524 is configured to analyze the structured light as projected by the projector 502 with the structured light data gathered by the camera 512 to determine characteristics about the topology of the scene.

A synchronization module 526 is configured to maintain synchronization between components and actions within the device or within multiple devices. The synchronization module 526 may be configured to synchronize particular wavelength modulator states and the acquisition of images by the camera 512. A wavelength modulation synchronization signal 128 may be distributed to the projector 502, the camera 512, or both. An independent clocking source, the projector 502, the camera 512, or another device may also generate the signal 128. When synchronous, the non-visible light image such as the structured light pattern 504 is presented and contemporaneously imaged by the camera 512. Synchronization thus aids in the recovery of the structured light data from the scene.

The synchronization module 526 may also be configured to coordinate multiple projectors 502, multiple cameras 512, and so forth. For example, multiple projectors 502 in a room may be coordinated such that each projector 502 is configured to generate a structured light pattern with the non-visible wavelengths at different times, using different pre-determined ranges of non-visible wavelengths, or both.

The wavelength modulation synchronization signal may be triggered by one or more different events. In one implementation, the synchronization may be based on frame timing. In another implementation, the synchronization may be based on sub-frame timing, or the wavelength modulation state.

Recovery of the structured light data from the scene may also occur using a "free running" camera 512 which does not use the synchronization signal 128. In such an implementation, the camera 512 may be configured to scan at a sufficiently high rate, such as twice the sub-frame rate, and track and recover the timing of the non-visible light sub-frame.

While these modules are described as being stored such as in the memory 520 and executed by the processor 516, it is understood that in some implementations all or part of the functions provided by these modules may be performed by devices such as application-specific integrated circuits, field programmable gate arrays, or other dedicated circuitry.

Figure 6:
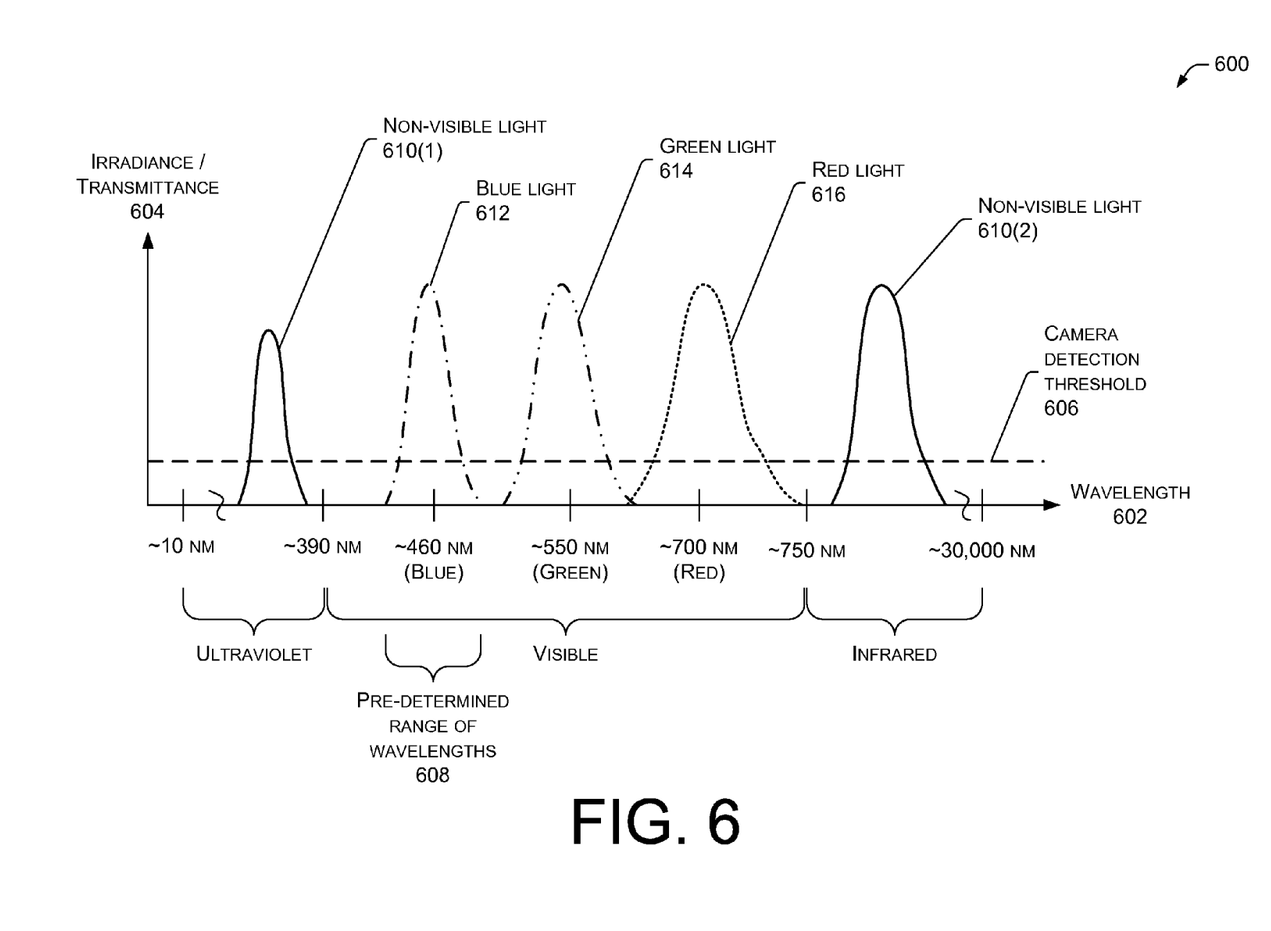
FIG. 6 is a spectrum chart illustrating the pre-determined ranges of visible and non-visible wavelengths which may be produced by the image projector.

FIG. 6 is a spectrum chart 600 illustrating the pre-determined ranges of visible and non-visible wavelengths such as may be produced by the wavelength modulator 106 or the wavelength modulated light source 302. In this chart the X axis indicates a wavelength 602 while the Y axis indicates an irradiance (such as with the wavelength modulated light source 302) or a transmittance 604 (such as with the multiple-wavelength light source 102.) The distribution of points along the axes is not necessarily to scale.

A camera detection threshold 606 is also shown. The camera detection threshold 606 indicates a minimum strength or sensitivity of a received photon at the camera detector which will generate a signal in the camera. For ease of illustration and discussion, the camera detection threshold 606 is shown as being flat across the entire spectrum. However, it is understood that the detection threshold of a given camera may vary with wavelength.

Among the wavelengths shown and their designations on this chart is ultraviolet (UV) light with a wavelength of about 10 nm to 390 nm. Visible light as shown extends from about 390 nm to 750 nm. Infrared (IR) is shown from about 750 nm to about 30,000 nm. The definition of visible and non-visible light may vary with the user. For example, the typical human eye is considered capable of detecting the visible light wavelengths, but is generally incapable of detecting wavelengths outside of this range. Thus, UV and IR light are considered non-visible to the human eye. However, where the users include other organisms, the definition of visible and non-visible light wavelengths may be suitably adjusted to accommodate the differing physiologies of these users. For example, where the human user has pet bird whose visible range extends into a portion of the ultraviolet spectrum, non-UV non-visible light may be used.

As described above, wavelength modulated light 122 may encompass a pre-determined range of wavelengths 608. In some implementations the pre-determined range of wavelengths 608 may be very narrow, such as in the case of monochromatic light. In other implementations, the pre-determined range of wavelengths 608 may be broader, such as a green filter segment configured to pass wavelengths of 520-570 nm.

Also shown on the chart are the transmittance/irradiance 604 curves for several different "colors" or pre-determined ranges of wavelengths 608. A non-visible light in the UV band is shown at 610(1). Likewise, a non-visible light in the IR band is shown at 610(2). In one implementation, non-visible light with a wavelength of about 940 nm may be used. Water in the atmosphere absorbs 940 nm wavelength light well, and thus at short ranges this wavelength is useful for structured light because longer range sources, such as the sun are heavily attenuated due to the absorption. Additionally, 940 nm wavelength light is readily produced by available light sources, such as light-emitting diodes and lasers and is also readily imaged by existing cameras. Also shown are curves corresponding to the irradiance/transmittance of light sources or filters, respectively, for blue light 612, green light 614, and red light 616.

Figure 7:
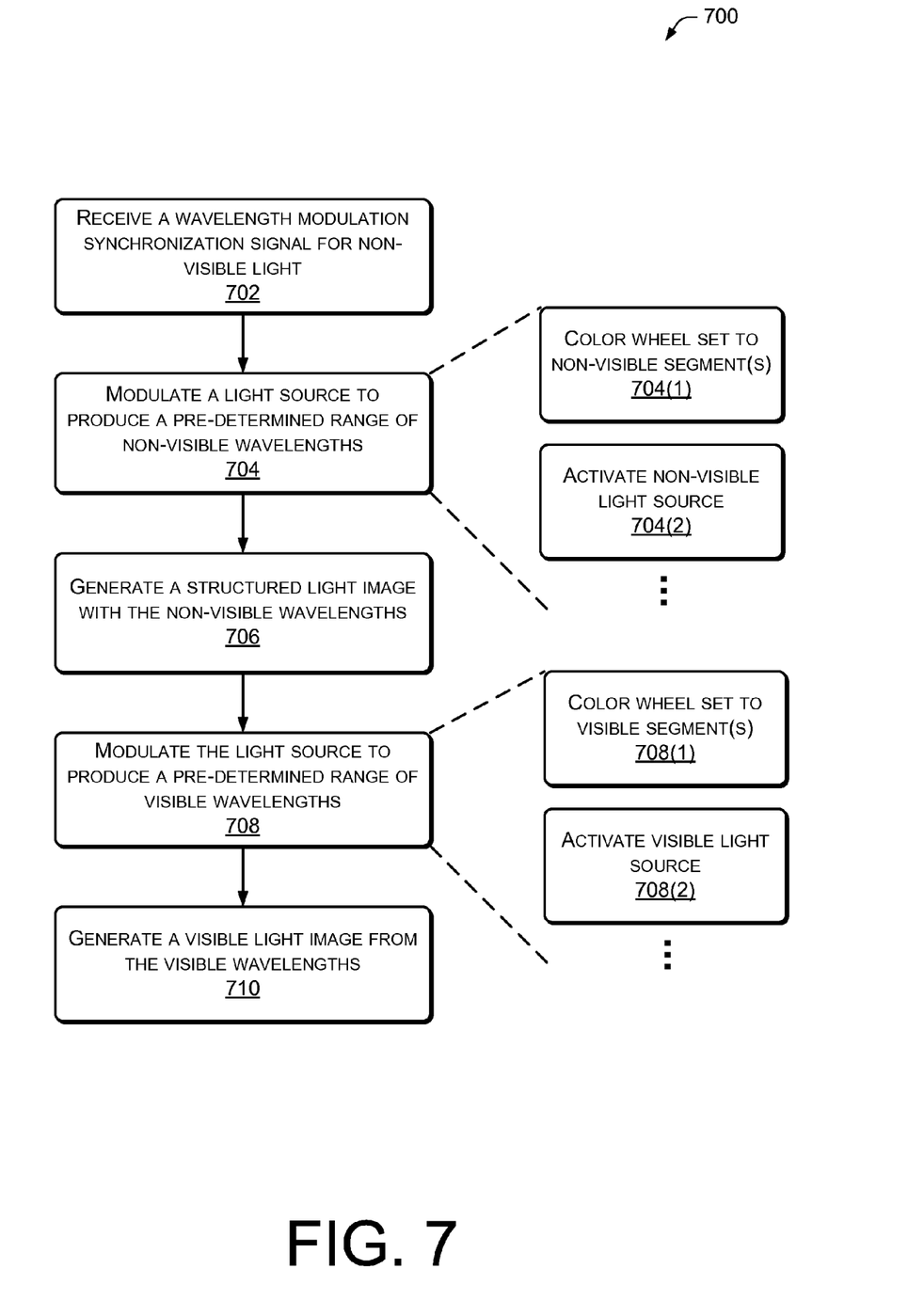
FIG. 7 is a process of generating visible images and non-visible images by modulating the wavelength produced by a light source.

FIG. 7 is a process 700 of generating visible images and non-visible structured light patterns by modulating the wavelength produced by a light source. This process 700 may be implemented by the architectures herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other operating systems as well.

At 702, a wavelength modulation synchronization signal for non-visible light is received. In some implementations, the controller 126, projector 502, camera 512, input/output interface 518, and so forth may generate the signal 128.

At 704, a light source is modulated to produce a pre-determined range of non-visible wavelengths. This modulation may include setting a color wheel to place a particular non-visible light segment into the optical path 704(1) or activating a non-visible light source 704(2). For example, as described above the non-visible light segment 114 of the color wheel 108 may be placed into the optical path to filter the multiple-wavelength light source 102, or a particular non-visible light source 304 may be activated.

At 706, a structured light pattern is generated with the non-visible wavelengths. For example, the imaging modulator 124 may be configured to generate the structured light pattern 504 from the non-visible light.

At 708, the light source is modulated to produce a pre-determined range of visible wavelengths. This modulation may include setting a color wheel 708(1) to place a particular visible light segment into the optical path, or activating a visible light source 708(2). For example, as described above the first visible light segment 116 of the color wheel 108 may be placed into the optical path, or a particular first visible light source 306 may be activated.

At 710, a visible light image is generated with the visible light wavelengths. For example, the imaging modulator 124 may be configured to generate the sub-frame image associated with the wavelength of visible light. Thus, the same projection system is able to generate visible and non-visible images.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An image projection system comprising:
   a light source configured to generate light having a plurality of wavelengths both visible and non-visible;
   a color wheel optically coupled to the light source and configured to selectively pass a pre-determined range of wavelengths from the light source, the color wheel comprising:
      a plurality of visible light segments, each being configured to pass a pre-determined range of visible wavelengths;
      one or more non-visible light segments, each being configured to pass a pre-determined range of non-visible wavelengths;
   an imaging modulator configured to generate an image from the light passed by the color wheel and to generate at least a portion of a structured light pattern while the one or more non-visible light segments of the color wheel are passing the pre-determined range of non-visible wavelengths;
   a camera configured to detect the non-visible light and gather structured light data indicative of the structured light pattern projected onto a physical scene; and
   a computing device configured to:
      determine a topology of the physical scene by analyzing distortion in the structured light data; and
      based on the analyzed distortion in the structured light data, cause adjustment of at least one of a frequency, a duration, or a sequencing of the non-visible wavelengths passed by the one or more non-visible light segments of the color wheel.

2. The system of claim 1, further comprising:
   a color wheel motor coupled to the color wheel and configured to rotate the color wheel; and
   a controller coupled to and configured to synchronize the color wheel motor and the imaging modulator.

3. The system of claim 2, wherein the controller is further configured to generate a synchronization signal indicating a state of the color wheel.

4. The system of claim 3, wherein the camera is configured to accept the synchronization signal indicating the state of the color wheel.

5. The system of claim 1, wherein the visible wavelengths extend from about 390 nanometers to about 750 nanometers.

6. The system of claim 1, wherein the non-visible wavelengths are less than about 390 nanometers or greater than about 750 nanometers.

7. The system of claim 1, wherein the imaging modulator comprises a digital micromirror device.

8. A system comprising:
   a projector comprising:
      a wavelength modulated light source configured to generate light having a particular pre-determined range of wavelengths both visible and non-visible; and
      one or more imaging modulators configured to generate visible and non-visible images from the light generated by the wavelength modulated light source;
   wherein the projector is configured to project the visible and non-visible images onto a physical scene in an environment;
   a camera configured to capture the non-visible images projected onto the physical scene to characterize a topology of the physical scene; and
   wherein the wavelength modulated light source is further configured to adjust a range of wavelengths of the non-visible light based at least in part on the non-visible images captured by the camera.

9. The system of claim 8, wherein the wavelength modulated light source generates non-visible wavelengths at a pre-determined periodic interval.

10. The system of claim 8, wherein the wavelength modulated light source generates non-visible wavelengths upon receipt of a signal from a controller.

11. The system of claim 8, wherein the wavelength modulated light source is further configured to alternate between a pre-determined wavelength modulation pattern of visible and non-visible wavelengths.

12. The system of claim 8, wherein the one or more imaging modulators comprise a digital micromirror device.

13. The system of claim 8, wherein the one or more imaging modulators comprise a liquid crystal.

14. The system of claim 8, wherein the wavelength modulated light source comprises one or more lasers.

15. The system of claim 8, wherein the wavelength modulated light source comprises a solid state light source.

16. The system of claim 15, wherein the solid state light source comprises a light emitting diode.

17. The system of claim 8, wherein the wavelength modulated light source comprises a lamp coupled to a color wheel, the color wheel comprising:
   one or more visible light segments, each being configured to pass a pre-determined range of visible wavelengths; and
   one or more non-visible light segments, each being configured to pass a pre-determined range of non-visible wavelengths.

18. The system of claim 8, wherein the wavelength modulated light source comprises a lamp coupled to a wavelength modulator, the wavelength modulator configured to:
   pass a pre-determined range of visible wavelengths at a first time; and
   pass a pre-determined range of non-visible wavelengths at a second time.

19. The system of claim 18, wherein the wavelength modulator comprises a liquid crystal device.

20. One or more non-transitory computer-readable media storing computer-executable instructions that, when executed, cause one or more processors to perform acts comprising:
    modulating one or more light sources to produce light having a pre-determined range of non-visible wavelengths;
    generating a structured light pattern with the non-visible wavelengths;
    projecting the structured light pattern onto a physical scene;
    modulating the one or more light sources to produce a pre-determined range of visible wavelengths;
    generating a visible light image with the visible wavelengths;
    projecting the visible light image onto the physical scene;
    capturing an image of the structured light pattern projected into the physical scene;
    analyzing the captured image to identify distortion in the structured light pattern to determine characteristics of a topology of the physical scene;
    generating an adjusted structural light pattern based at least in part on the determined characteristics of the topology of the physical scene; and
    projecting the adjusting structural light pattern onto the physical scene.

21. The one or more non-transitory computer-readable storage media of claim 20, wherein the generating images comprises controlling one or more imaging modulators.

22. The one or more non-transitory computer-readable storage media of claim 20, further comprising synchronizing the generation of the structured light pattern with the capturing of the image.

23. The one or more non-transitory computer-readable storage media of claim 20, wherein the modulating the light source comprises controlling a color wheel motor.

24. The one or more non-transitory computer-readable storage media of claim 20, wherein the modulating the light source comprises controlling activation of one or more solid state light sources.

25. The one or more non-transitory computer-readable storage media of claim 20, further comprising receiving a wavelength modulation synchronization signal.

26. The one or more non-transitory computer-readable storage media of claim 20, further comprising:
    synchronizing a plurality of projectors such that each projector is configured to generate the structured light pattern with the non-visible wavelengths at different times, using different pre-determined ranges of non-visible wavelengths, or both.

* * * * *